United States Patent
Zhao et al.

(10) Patent No.: US 12,517,567 B2
(45) Date of Patent: Jan. 6, 2026

(54) OPERATING MODE CONTROL MANAGEMENT

(71) Applicant: Beken Corporation, Shanghai (CN)

(72) Inventors: Chen Zhao, Shanghai (CN); Longbao Hu, Shanghai (CN); Long Chen, Shanghai (CN)

(73) Assignee: Beken Corporation, Shanghai (CN)

( * ) Notice: Subject to any disclaimer, the term of this patent is extended or adjusted under 35 U.S.C. 154(b) by 107 days.

(21) Appl. No.: 18/663,763

(22) Filed: May 14, 2024

(65) Prior Publication Data
US 2025/0335017 A1 Oct. 30, 2025

(30) Foreign Application Priority Data
Apr. 25, 2024 (CN) .......................... 202410510008.6

(51) Int. Cl.
*G06F 1/00* (2006.01)
*G06F 1/3234* (2019.01)
*G06F 1/3296* (2019.01)

(52) U.S. Cl.
CPC .......... *G06F 1/3234* (2013.01); *G06F 1/3296* (2013.01)

(58) Field of Classification Search
CPC ...... G06F 1/324; G06F 1/3203; G06F 1/3206; G06F 1/3287; G06F 1/32; G06F 1/3231; G06F 1/3265; G06F 9/4418; G06F 1/3234; G06F 1/3296
See application file for complete search history.

(56) References Cited

U.S. PATENT DOCUMENTS

| | | | |
|---|---|---|---|
| 10,802,568 B2* | 10/2020 | Lingutla | H04B 17/318 |
| 2015/0340875 A1* | 11/2015 | Prasad | H02J 50/60 |
| | | | 307/104 |
| 2017/0359798 A1* | 12/2017 | Bradley | H04W 4/38 |
| 2019/0297398 A1* | 9/2019 | Burton | H04Q 9/00 |
| 2021/0083955 A1* | 3/2021 | Kanaya | H04W 76/10 |
| 2023/0147849 A1* | 5/2023 | Chen | G06F 1/1632 |
| | | | 713/323 |
| 2023/0291559 A1* | 9/2023 | Kim | H04W 4/70 |
| 2025/0237187 A1* | 7/2025 | Martinez | F02D 29/02 |
| 2025/0307385 A1* | 10/2025 | Charboneau, Jr. | G06N 20/00 |

* cited by examiner

*Primary Examiner* — Xuxing Chen
(74) *Attorney, Agent, or Firm* — Schwegman Lundberg & Woessner, P.A.

(57) ABSTRACT

Various embodiments described herein support or provide operations including monitoring an operating mode of a controller via a Bluetooth hardware component; causing the Bluetooth hardware component to transmit broadcasting packets at a time interval; receiving a response to a broadcasting packet from a user device coupled to the Bluetooth hardware component; determining a user activity based on the response; changing the operating mode of the controller based on the user activity.

20 Claims, 9 Drawing Sheets

OPERATING MODE CONTROL MANAGEMENT

CROSS-REFERENCE TO RELATED APPLICATIONS

This application claims priority to and incorporates by reference Chinese application no. 202410510008.6 filed 25 Apr. 2024.

TECHNICAL FIELD

The present disclosure generally relates to data generation, processing, and management. more particularly, various embodiments described herein provide for systems, methods, techniques, instruction sequences, and devices that facilitate operating mode control management.

BACKGROUND

Existing systems face challenges in optimizing the power consumption of electronic devices to ensure efficient and effective operation while minimizing energy waste. Specifically, it is a challenge to identify a user activity and determine an optimal time to put an electronic device in an operating mode based on the user activity. It is also a challenge to allow context to be passed via programming commands so that the electronic device is aware of the reasons why it was placed in a specific operating mode.

SUMMARY

An embodiment provides a method comprising monitoring an operating mode of a controller via a Bluetooth hardware component; causing the Bluetooth hardware component to transmit broadcasting packets at a time interval; receiving a response to a broadcasting packet from a user device coupled to the Bluetooth hardware component; determining a user activity based on the response; and changing the operating mode of the controller based on the user activity.

In an embodiment of the method, further comprising using the Bluetooth hardware to detect a General Purpose Input/Output (GPIO) signal from the controller; and determining the operating mode of the controller based on the GPIO signal.

In an embodiment of the method, further comprising configuring a pin of the Bluetooth hardware component as a digital input and output (I/O) port; and transmitting, via the digital I/O port, one or more programming commands between the controller and the Bluetooth hardware component to change the operating mode of the controller, the one or more programming commands including data representing the user activity.

In an embodiment of the method, further comprising configuring a control logic based on a binary-to-ASCII encoding and decoding mechanism, the control logic allowing the one or more programming commands transmitted between the controller and the Bluetooth hardware component to adjust the operating mode of the controller.

In an embodiment of the method, wherein the binary-to-ASCII encoding and decoding mechanism is used to represent binary data by one or more human-readable ASCII characters.

In an embodiment of the method, wherein the response to the broadcasting packet comprises a user activity identifier and a timestamp associated with the user activity. The timestamp represents a time when the user activity was detected by the user device.

In an embodiment of the method, wherein the broadcasting packet further comprises a Received Signal Strength Indicator (RSSI) indicating a strength of a signal associated with the response to the broadcasting packet.

In an embodiment of the method, further comprising determining a threshold time period elapsed since the response to the broadcasting packet was received; changing the operating mode of the controller to standby mode; and generating a log event that indicates the controller was changed to the standby mode due to an elapsed threshold time period.

In an embodiment of the method, wherein the operating mode of the controller is in active mode, wherein the response to the broadcasting packet is a first response to a first broadcasting packet, and wherein the method further comprises receiving a second response to a second broadcasting packet within a threshold time period since receiving the first response to the first broadcasting packet; determining that a difference between a first RSSI value in the first response and a second RSSI value in the second response is less than a first threshold value; determining that the second RSSI value is less than a second threshold value; determining that a user activity identifier in the second response does not correspond to a predetermined user activity; and based on the determining of the difference, the determining of the second RSSI value, and the determining of the user activity identifier, changing the operating mode of the controller to standby mode.

In an embodiment of the method, further comprising generating a log event that indicates the controller was changed to the standby mode based on the determining of the difference between the first RSSI value and the second RSSI value being less than the first threshold value, the determining of the second RSSI value being less than the second threshold value, and the determining of the user activity identifier not corresponding to the predetermined user activity.

An embodiment provides a system comprising one or more hardware processors; and a non-transitory machine-readable medium for storing instructions that, when executed by the one or more hardware processors, cause the one or more hardware processors to perform operations comprising monitoring an operating mode of a controller via a Bluetooth hardware component; causing the Bluetooth hardware component to transmit broadcasting packets at a time interval; receiving a response to a broadcasting packet from a user device coupled to the Bluetooth hardware component; determining a user activity based on the response; and changing the operating mode of the controller based on the user activity.

In an embodiment of the system, wherein the operations further comprise using the Bluetooth hardware component to detect a General Purpose Input/Output (GPIO) signal from the controller; and determining the operating mode of the controller based on the GPIO signal.

In an embodiment of the system, wherein the operations further comprise configuring a pin of the Bluetooth hardware component as a digital input and output (I/O) port; and transmitting, via the digital I/O port, one or more programming commands between the controller and the Bluetooth hardware component to change the operating mode of the controller, the one or more programming commands including data representing the user activity.

In an embodiment of the system, wherein the operations further comprise configuring a control logic based on a binary-to-ASCII encoding and decoding mechanism, the control logic allowing the one or more programming commands transmitted between the controller and the Bluetooth hardware component to adjust the operating mode of the controller.

In an embodiment of the system, wherein the response to the broadcasting packet comprises a user activity identifier and a timestamp associated with the user activity. The timestamp represents a time when the user activity was detected by the user device.

In an embodiment of the system, wherein the broadcasting packet further comprises a Received Signal Strength Indicator (RSSI) indicating a strength of a signal associated with the response to the broadcasting packet.

In an embodiment of the system, wherein the operating mode of the controller is in active mode, and wherein the operations further comprise determining a threshold time period elapsed since the response to the broadcasting packet was received; changing the operating mode of the controller to standby mode; and generating a log event that indicates the controller was changed to the standby mode due to an elapsed threshold time period.

In an embodiment of the system, wherein the operating mode of the controller is in active mode, wherein the response to the broadcasting packet is a first response to a first broadcasting packet, and wherein the operations further comprise receiving a second response to a second broadcasting packet within a threshold time period since receiving the first response to the first broadcasting packet; determining that a difference between a first RSSI value in the first response and a second RSSI value in the second response is less than a first threshold value; determining that the second RSSI value is less than a second threshold value; determining that a user activity identifier in the second response does not correspond to a predetermined user activity; and based on the determining of the difference, the determining of the second RSSI value, and the determining of the user activity identifier, changing the operating mode of the controller to standby mode.

In an embodiment of the system, wherein the operations further comprise generating a log event that indicates the controller was changed to the standby mode based on the determining of the difference between the first RSSI value and the second RSSI value being less than the first threshold value, the determining of the second RSSI value being less than the second threshold value, and the determining of the user activity identifier not corresponding to the predetermined user activity.

An embodiment provides a non-transitory machine-readable medium for storing instructions that, when executed by one or more hardware processors, cause the one or more hardware processors to perform operations comprising monitoring an operating mode of a controller via a Bluetooth hardware component; causing the Bluetooth hardware component to transmit broadcasting packets at a time interval; receiving a response to a broadcasting packet from a user device coupled to the Bluetooth hardware component; determining a user activity based on the response; and changing the operating mode of the controller based on the user activity.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of examples, and not limitations, in the accompanying figures.

DETAILED DESCRIPTION

Figure 1:
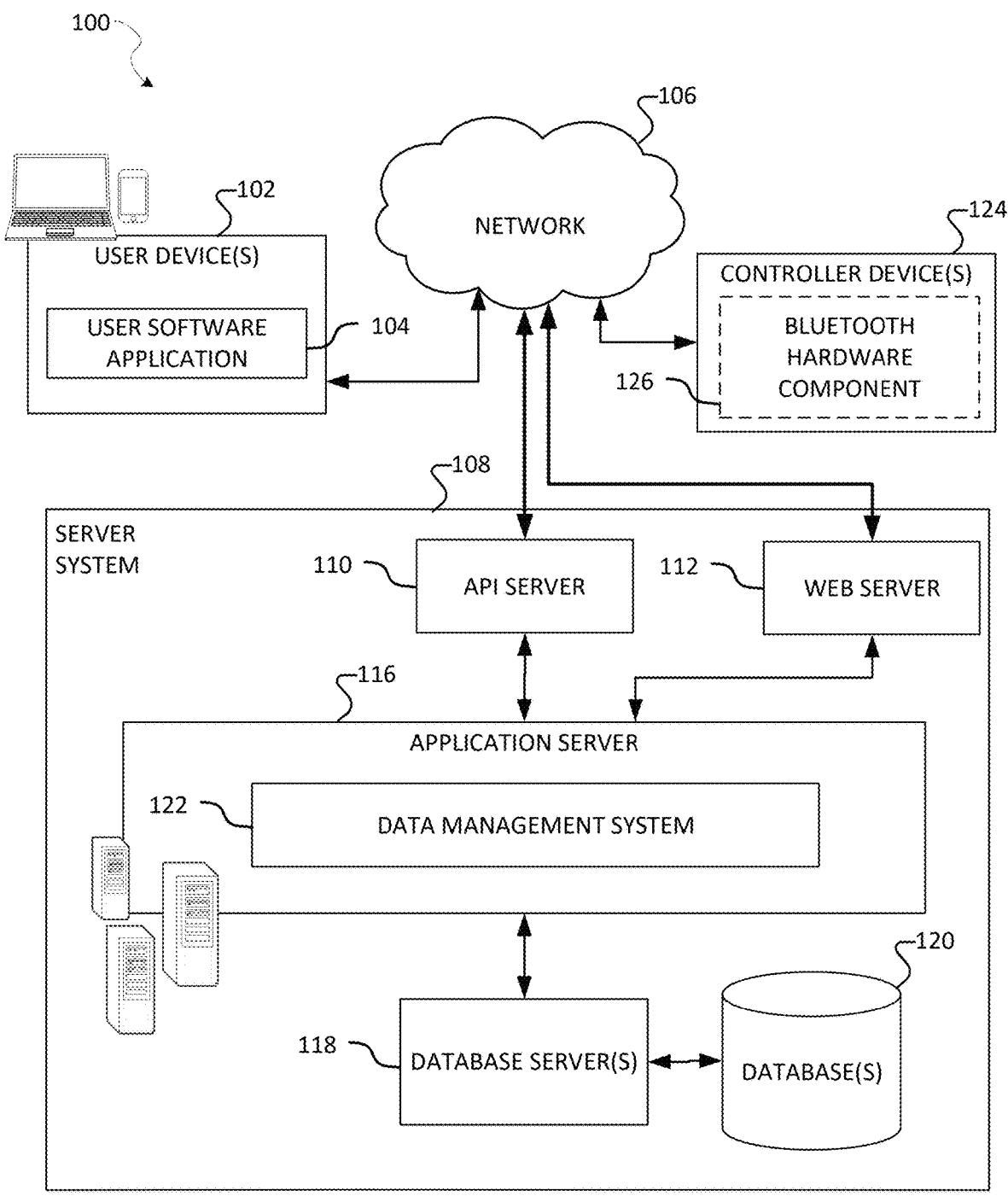
FIG. 1 is a block diagram showing an example data system that includes a data management system, according to various embodiments of the present disclosure.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various embodiments may be given throughout this description. These are merely descriptions of specific embodiments. The scope or meaning of the claims is not limited to the embodiments given.

Existing systems face challenges in optimizing the power consumption of electronic devices to ensure efficient and effective operation while minimizing energy waste. Specifically, it is a challenge to identify a user activity and determine an optimal time to put an electronic device in an operating mode based on the user activity. It is also a challenge to allow context to be passed via programming commands so that the electronic device is aware of the reasons why it was placed in a specific operating mode.

Various embodiments include systems, methods, and non-transitory computer-readable media that facilitate operating mode control management. Specifically, a data management system controls the operating mode of electronic devices based on the determination of user activities. Under this approach, the data management system can automatically determine the optimal time to enter the appropriate operating mode (e.g., active mode, standby mode), thereby optimizing power consumption when users are away or not paying attention.

In various embodiments, the data management system can monitor the operating mode of a controller via a Bluetooth hardware component. A controller can be a component (e.g., a microprocessor) of an electronic device (e.g., a controller device). Examples of electronic devices can include televisions, set-top boxes, smartphones, laptops, tablets, headphones, speakers, printers, keyboards, etc. A Bluetooth hardware component can be a device communicatively coupled to the controller or a hardware component integrated into an electronic device that incorporates the controller.

In various embodiments, the data management system can cause the Bluetooth hardware component to broadcast data packets (also referred to as broadcasting packets) at a time interval. Broadcasting packets can be transmitted over a Bluetooth connection to multiple electronic devices (also referred to as devices) simultaneously. Bluetooth broadcasting allows one Bluetooth-enabled device to transmit data, often in the form of data packets (also referred to as broadcasting packets described herein), to be received by multiple other Bluetooth-enabled devices in the vicinity.

In various embodiments, the data management system can receive a response to a broadcasting packet from a user device coupled to the Bluetooth hardware component. The user device can be a Bluetooth-enabled device. It should be understood by a person of ordinary skill in the art that Bluetooth is a wireless communication standard that enables data exchange and connections between devices via short-range radio waves. A Bluetooth-enabled device can be any electronic device (e.g., televisions, set-top boxes, smartphones, laptops) that integrates Bluetooth wireless technology.

In various embodiments, the data management system can determine a user activity based on the response. Specifically, a response to a broadcasting packet can include, without limitation, a user activity identifier, a timestamp associated with the user activity representing a time when the user device detected the user activity, and a Received Signal Strength Indicator (RSSI) indicating the strength of a signal associated with the response to the broadcasting packet. The data management system can identify the user activity (or a user status) based on the user activity identifier. Example user activities (or user status) can include video or phone calls, screen off/screen lock, and gaming.

In various embodiments, the data management system can change (or adjust) the operating mode of the controller based on the determination of the user activity. For example, when the user activity is determined to be one of the video calls or phone calls, screen off/screen lock, or gaming, the user is likely not paying attention to the programs (e.g., TV programs) and/or services (e.g., TV program related services) provided via the controller. Therefore, the data management system can change the mode of the controller to standby mode to conserve power. Standby mode described herein refers to a low-power state where a device is active to some extent but consumes significantly less power than in its normal operating mode, such as the active mode described herein. Standby mode can also be referred to as sleep mode or idle mode. In various embodiments, upon determining that the user has finished (or stopped) the determined user activity, the data management system can cause the controller to automatically revert back to the active mode so that programs and/or services are readily ready for the user to enjoy, thereby the user experience is not compromised.

In various embodiments, when the controller is operating in active mode, the data management system can determine a threshold time period (e.g., one minute) that has elapsed since the previous response to a broadcasting packet was received. A lack of further response for more than the threshold time period can indicate that the user of the device may not be paying attention or has stepped away. The data management system can change the operating mode of the controller to standby mode to conserve power.

In various embodiments, when the controller is operating in active mode, the data management system receives a response to a broadcasting packet within a threshold time period since the previous response to a broadcasting packet was received. The data management system can determine a plurality of factors when assessing the need to put the device in inactive mode (e.g., standby mode or sleep mode).

In various embodiments, the first example factor is the difference between RSSI values. Specifically, the data management system can determine the difference between the RSSI value (e.g., the first RSSI value) in the previously received response (e.g., the first response) and the currently received RSSI value (e.g., the second RSSI value) in the currently received response (e.g., the second response) is less than a threshold value (e.g., first threshold value).

In various embodiments, the second example factor is the received RSSI value. Specifically, the data management system can determine that the currently received RSSI value (e.g., the second RSSI value) is less than a threshold value (e.g., the second threshold value).

In various embodiments, the third example factor is the type of the current user activity. Specifically, the data management system can determine that the user activity identifier in the second response does not correspond to a predetermined user activity (e.g., video call or phone call).

In various embodiments, at least based on the determination of the three example factors described above (e.g., all three factors are determined to be true), the data management system can change the operating mode of the controller to standby mode, assuming that the user of the device has stepped away.

In various embodiments, the data management system can generate log events to record the reasons why the data management system changed the operating mode of a controller. For example, a log event can be generated to indicate that the controller was changed to the standby mode based on the determining of the difference between the first RSSI value and the second RSSI value being less than the first threshold value, the determining of the second RSSI value being less than the second threshold value, and the determining of the user activity identifier not corresponding to the predetermined user activity. As another example, a log event can be generated to indicate that the controller was changed to the standby mode based on an elapsed threshold time period.

In various embodiments, the data management system can use the Bluetooth hardware component to detect one or more General Purpose Input/Output (GPIO) signals from the controller. The data management system can determine the current operating mode of the controller based on the one or more GPIO signals.

In various embodiments, the data management system configures a pin (e.g., GPIO pin) of the Bluetooth hardware component as a digital input and output (I/O) port. Under this approach, one GPIO pin of a Bluetooth hardware component can handle the GPIO communication with the controller, thereby reducing the production costs of the component, device, and/or the associated chips.

In various embodiments, the data management system can configure a control logic based on a binary-to-ASCII encoding and decoding mechanism. The binary-to-ASCII encoding and decoding mechanism represents binary data by one or more human-readable ASCII characters. The control logic is configured to handle GPIO communication (via programming commands) between the controller and the Bluetooth hardware component.

An example programming command can include one or more of a preamble code, an operation code, an operand, and a checksum. Preamble code can refer to a sequence of bits that indicates the start of data transmission. Preamble code helps a receiver device to synchronize with a sender device. An operation code can be used to specify a type of operation or instruction. For example, "1" can indicate standby mode (or sleep mode), whereas "2" can indicate active mode. An operand can refer to a value on which an operation is performed. An example operand in a programming command described herein can include a user activity identifier. A checksum can refer to a value computed from data in a data packet to check for errors.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes a data management system 122 (also referred to as system 122), according to various embodiments of the present disclosure. By including the data management system 122, the data system 100 can facilitate the generation of structured query language outputs using machine learning technologies. As shown, the data system 100 includes one or more user devices 102, a server system 108, and a network 106 (e.g., Internet, wide-area-network (WAN), local-area-network (LAN), wireless network) that communicatively couples them together. Each user device 102 can host a number of applications, including a user software application 104. The user software application 104 can communicate data with the server system 108 via a network 106. Accordingly, the user software application 104 can communicate and exchange data with the server system 108 via network 106.

The server system 108 provides server-side functionality via the network 106 to the user software application 104. While certain functions of the data system 100 are described herein as being performed by the data management system 122 on the server system 108, it will be appreciated that the location of certain functionality within the server system 108 is a design choice. For example, it may be technically feasible to initially deploy certain technology and functionality within the server system 108, but to later migrate this technology and functionality to the user software application 104.

The server system 108 supports various services and operations that are provided to the user software application 104 by the data management system 122. Such operations include transmitting data from the data management system 122 to the user software application 104, receiving data from the user software application 104 at the data management system 122, and the data management system 122 processing data generated by the user software application 104. Data exchanges within the data system 100 may be invoked and controlled through operations of software component environments available via one or more endpoints, or functions available via one or more user interfaces of the user software application 104, which may include web-based user interfaces provided by the server system 108 for presentation at the user device 102.

With respect to the server system 108, an Application Program Interface (API) server 110 and a web server 112 is coupled to an application server 116, which hosts the data management system 122. The application server 116 is communicatively coupled to a database server 118, which facilitates access to a database 120 that stores data associated with the application server 116, including data that may be generated or used by the data management system 122.

The API server 110 receives and transmits data (e.g., API calls, commands, requests, responses, and authentication data) between the user device 102 and the application server 116. Specifically, the API server 110 provides a set of interfaces (e.g., routines and protocols) that can be called or queried by the user software application 104 in order to invoke the functionality of the application server 116. The API server 110 exposes various functions supported by the application server 116 including, without limitation, user registration; login functionality; data object operations (e.g., generating, storing, retrieving, encrypting, decrypting, transferring, access rights, licensing); and/or user communications.

Through one or more web-based interfaces (e.g., web-based user interfaces), the web server 112 can support various functionality of the data management system 122 of the application server 116.

In various embodiments, user devices 102 are Bluetooth-enabled devices that can transmit and receive data via a Bluetooth connection described herein. In various embodiments, a controller device 124 can be an electronic device that includes a controller (e.g., microprocessor) described herein. Controller devices 124 can include a Bluetooth hardware component 126, as illustrated in FIG. 1, or can be communicatively coupled to a Bluetooth-enabled device that includes the Bluetooth hardware component 126. Examples of controller devices can include televisions, set-top boxes, smartphones, laptops, tablets, headphones, speakers, printers, keyboards, etc.

Figure 2:
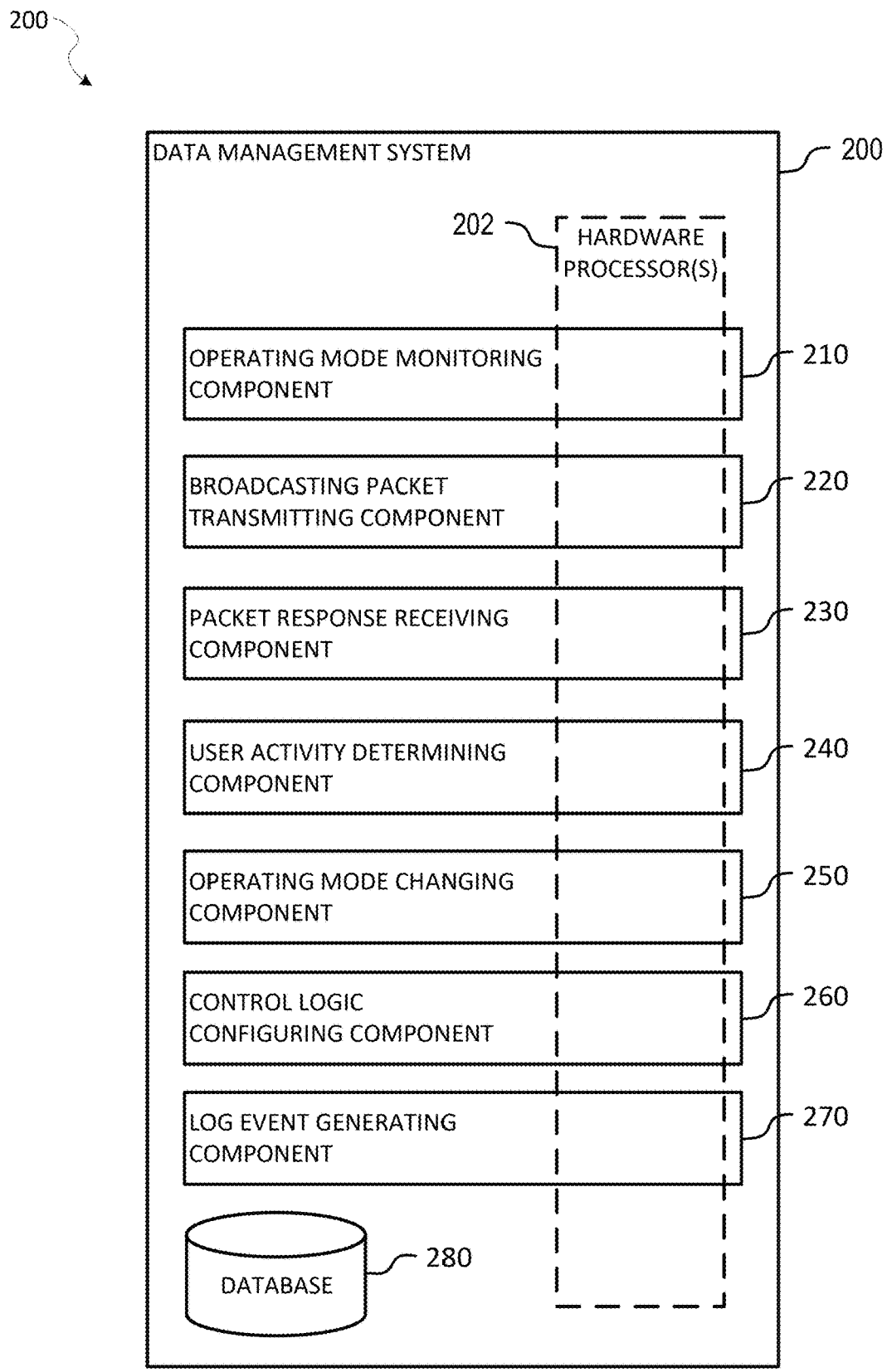
FIG. 2 is a block diagram illustrating an example data management system that facilitates operating mode control management, according to various embodiments of the present disclosure.

FIG. 2 is a block diagram illustrating an example data management system 200 that facilitates operating mode control management, according to various embodiments of the present disclosure. For some embodiments, the data management system 200 represents an example of the data management system 122 described with respect to FIG. 1. As shown, the data management system 200 comprises an operating mode monitoring component 210, a broadcasting packet transmitting component 220, a packet response receiving component 230, a user activity determining component 240, an operating mode changing component 250, a control logic configuring component 260, and a log event generating component 270. According to various embodiments, one or more of the operating mode monitoring component 210, the broadcasting packet transmitting component 220, the packet response receiving component 230, the user activity determining component 240, the operating mode changing component 250, the control logic configuring component 260, and the log event generating component 270 are implemented by one or more hardware processors 202. Data generated by one or more of the operating mode monitoring component 210, the broadcasting packet transmitting component 220, the packet response receiving component 230, the user activity determining component 240, the operating mode changing component 250, the control logic configuring component 260, and the log event generating component 270 may be stored in a database (or datastore) 280 of the data management system 200.

The operating mode monitoring component 210 is configured to monitor the operating mode of a controller via a Bluetooth hardware component. In various embodiments, a controller can be a component (e.g., microprocessor) of an electronic device or optionally referred to as an electronic device. Examples of electronic devices (also referred to as controller devices) can include televisions, set-top boxes, smartphones, laptops, tablets, headphones, speakers, printers, keyboards, etc. A Bluetooth hardware component can be a device communicatively coupled to the controller or a hardware component integrated into an electronic device that incorporates the controller.

The broadcasting packet transmitting component 220 is configured to cause the Bluetooth hardware component to broadcast data packets (also referred to as broadcasting packets) at a time interval. Broadcasting packets can be transmitted over a Bluetooth connection to multiple devices simultaneously.

The packet response receiving component 230 is configured to receive responses to broadcasting packets from one or more user devices described herein. A response of a broadcasting packet can include, without limitation, a user activity identifier, a timestamp associated with the user activity representing a time when the user device detected the user activity, and a Received Signal Strength Indicator (RSSI) indicating the strength of a signal associated with the response to the broadcasting packet.

The user activity determining component 240 is configured to identify user activities based on the user activity identifiers included in the received responses of broadcasting packets. Example user activities include video or phone calls, screen off/screen lock, and gaming.

The operating mode changing component 250 is configured to change (or adjust) the operating mode of the controller based on the determination of the user activity.

The control logic configuring component 260 is configured to generate a control logic based on a binary-to-ASCII encoding and decoding mechanism. The binary-to-ASCII encoding and decoding mechanism represents binary data by one or more human-readable ASCII characters. The control logic is configured to handle GPIO communication (via programming commands) between the controller and the Bluetooth hardware component.

The log event generating component 270 is configured to generate log events to record the reasons why the data management system changed the operating mode of a controller.

Figure 3:
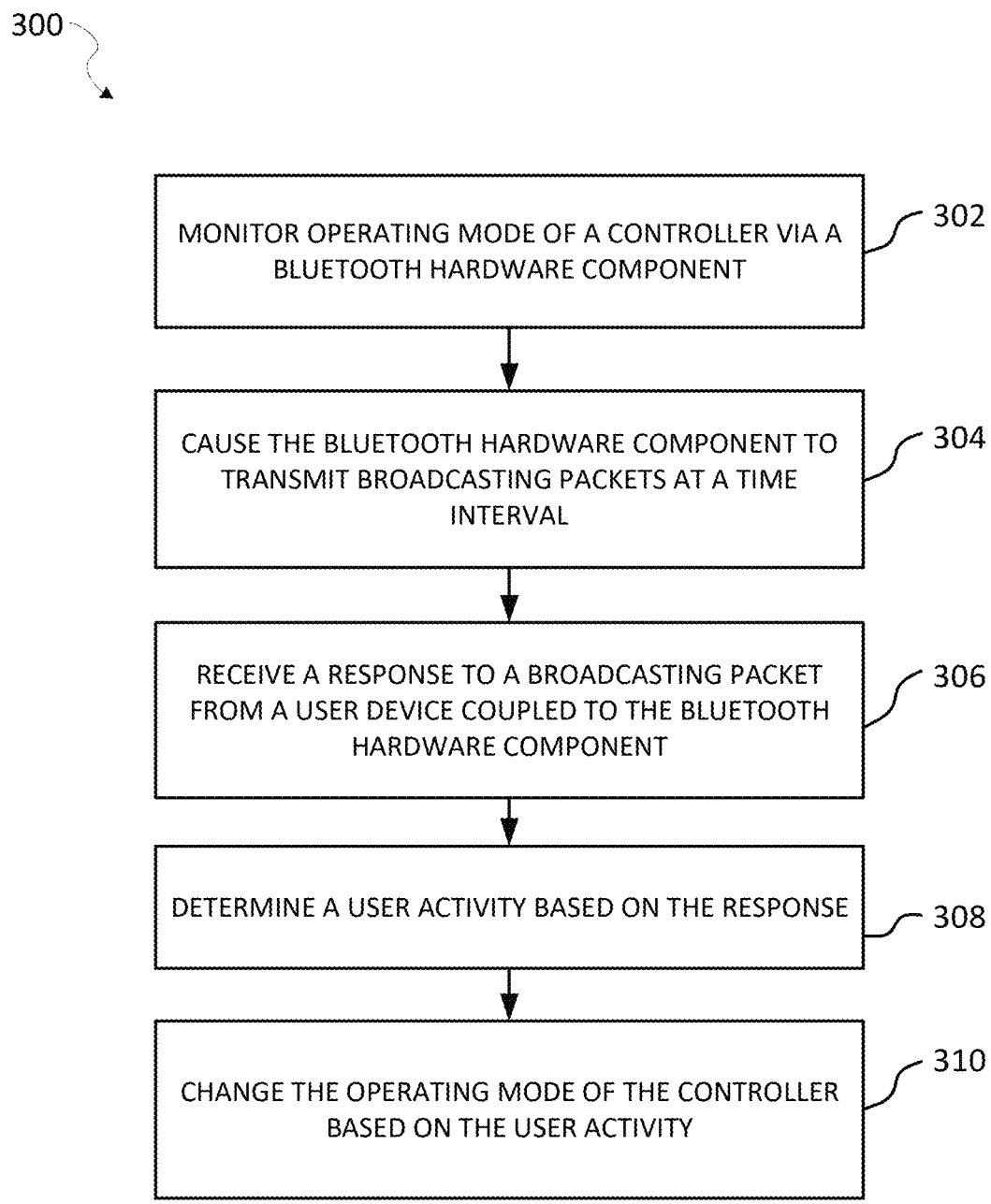
FIG. 3 is a flowchart illustrating an example method for operating mode control management, according to various embodiments of the present disclosure.

FIG. 3 is a flowchart illustrating an example method 300 for operating mode control management, according to various embodiments of the present disclosure. It will be understood that example methods described herein may be performed by a machine in accordance with some embodiments. For example, method 300 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, a processor monitors the operating mode of a controller via a Bluetooth hardware component. A controller can be an electronic device or a component (e.g., microprocessor) of an electronic device. A Bluetooth hardware component can be a device communicatively coupled to the controller or a hardware component integrated into an electronic device that incorporates the controller.

At operation 304, a processor causes the Bluetooth hardware component to broadcast data packets (also referred to as broadcasting packets) at a time interval. Broadcasting packets can be transmitted over a Bluetooth connection to multiple user devices simultaneously.

At operation 306, a processor receives responses to broadcasting packets from one or more user devices described herein. A response of a broadcasting packet can include, without limitation, a user activity identifier, a timestamp associated with the user activity representing a time when the user device detected the user activity, and a Received Signal Strength Indicator (RSSI) indicating the strength of a signal associated with the response to the broadcasting packet.

At operation 308, a processor determines user activities based on the user activity identifiers included in the received responses of broadcasting packets.

At operation 310, a processor changes the operating mode of the controller based on the determination of the user activity.

Though not illustrated, method 300 can include an operation where a graphical user interface is displayed (or caused to be displayed) by the hardware processor. For instance, the operation can cause a user device (e.g., the user device 102 communicatively coupled to the data management system 122) to display the graphical user interface. This operation for displaying the graphical user interface can be separate from operations 302 through 310 or, alternatively, form part of one or more of operations 302 through 310.

Figure 4:
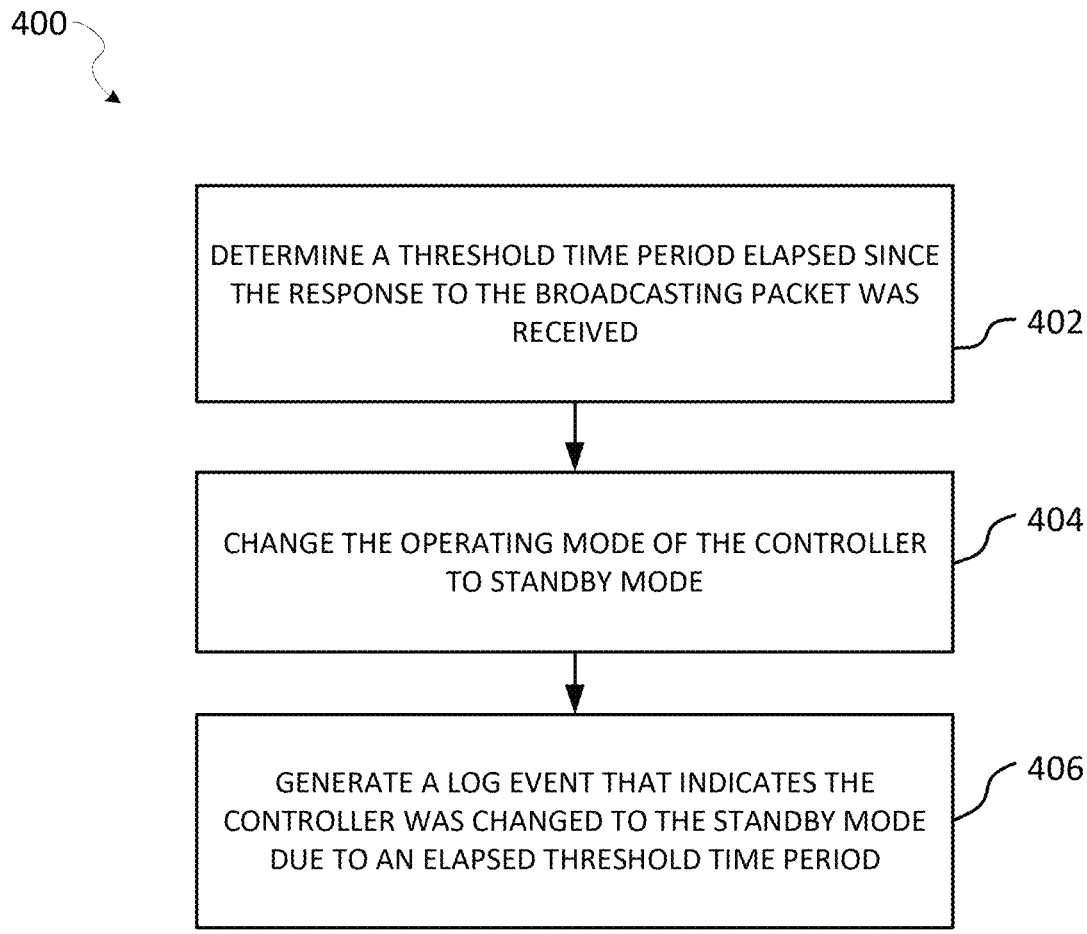
FIG. 4 is a flowchart illustrating an example method for operating mode control management, according to various embodiments of the present disclosure.

FIG. 4 is a flowchart illustrating an example method 400 for operating mode control management, according to various embodiments of the present disclosure. It will be understood that example methods described herein may be performed by a machine in accordance with some embodiments. For example, method 400 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. Operations in method 400 can be performed dependently or independently from operations in methods 300 and 500.

At operation 402, a processor determines a threshold time period (e.g., one minute) that has elapsed since the previous response to a broadcasting packet was received. A lack of further response for more than the threshold time period can indicate that the user of the device may not be paying attention or has stepped away.

At operation 404, based on the determination of the lack of further response, a processor changes the operating mode of the controller to standby mode to conserve power.

At operation 406, a processor generates one or more log events to indicate that the controller was changed to standby mode due to a lack of further response for more than the threshold time period.

Though not illustrated, method 400 can include an operation where a graphical user interface can be displayed (or caused to be displayed) by the hardware processor. For instance, the operation can cause a user device (e.g., the user device 102 communicatively coupled to the data management system 122) to display the graphical user interface. This operation for displaying the graphical user interface can be separate from operations 402 through 406 or, alternatively, form part of one or more of operations 402 through 406.

Figure 5:
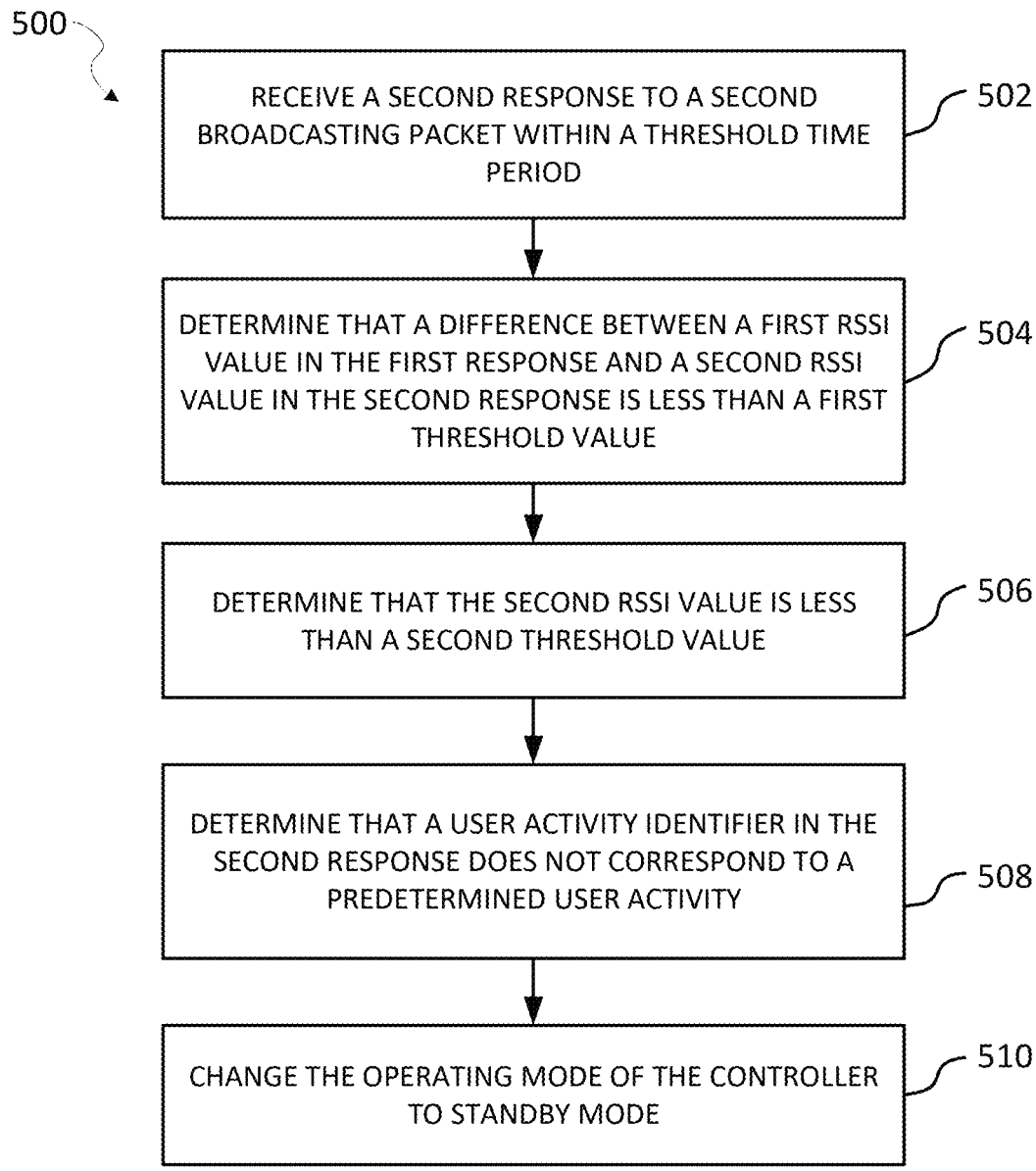
FIG. 5 is a flowchart illustrating an example method for operating mode control management, according to various embodiments of the present disclosure.

FIG. 5 is a flowchart illustrating an example method 500 for operating mode control management, according to various embodiments of the present disclosure. It will be understood that example methods described herein may be performed by a machine in accordance with some embodiments. For example, method 500 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 500 may be represented by executable instructions that, when executed by a processor of a computing device, cause the computing device to perform method 500. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. Operations in method 500 can be performed dependently or independently from operations in methods 300 and 400.

At operation 502, a processor receives a response (e.g., the second response) to a broadcasting packet (e.g., the second broadcasting packet) within a threshold time period since the previous response (e.g., the first response) to a broadcasting packet (e.g., the first broadcasting packet) was received.

At operation 504, a processor determines the difference between the RSSI value (e.g., the first RSSI value) in the previously received response (e.g., the first response) and the currently received RSSI value (e.g., the second RSSI value) in the currently received response (e.g., the second response) is less than a threshold value (e.g., first threshold value).

At operation 506, a processor determines that the currently received RSSI value (e.g., the second RSSI value) is less than a threshold value (e.g., the second threshold value).

At operation 508, a processor determines that the user activity identifier in the second response does not correspond to a predetermined user activity (e.g., video call or phone call).

At operation 510, at least based on the determinations discussed under operations 504-508, a processor can change the operating mode of the controller to standby mode. Specifically, if all three conditions discussed under operations 504-508 are true, a user of the user device likely has stepped away.

Though not illustrated, method 500 can include an operation where a graphical user interface can be displayed (or caused to be displayed) by the hardware processor. For instance, the operation can cause a user device (e.g., the user device 102 communicatively coupled to the data management system 122) to display the graphical user interface. This operation for displaying the graphical user interface can be separate from operations 502 through 510 or, alternatively, form part of one or more of operations 502 through 510.

Figure 6:
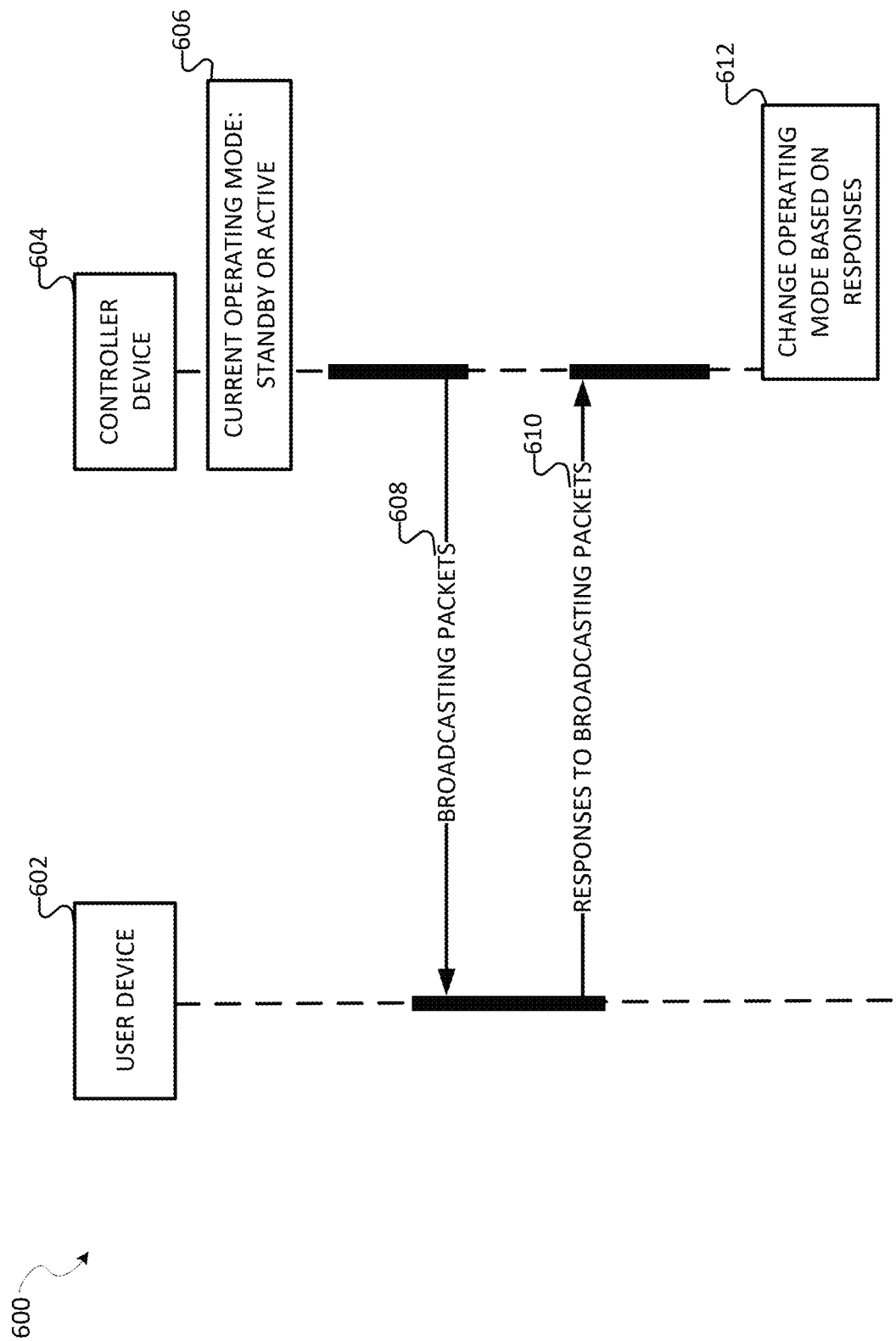
FIG. 6 is a sequence diagram illustrating data flow within an example data management system that facilitates operating mode control management during operation, according to various embodiments of the present disclosure.

FIG. 6 is a sequence diagram illustrating data flow 600 within an example data management system that facilitates operating mode control management during operation, according to various embodiments of the present disclosure. As shown, controller device 604 is configured to transmit broadcasting packets to nearby user devices (e.g., user device 602) via a Bluetooth connection. User device 602 is a Bluetooth-enabled device described herein. The data management system (e.g., systems 122 and 200) can cause the user device 602 to transmit responses to the received broadcasting packets. An example response 610 of a broadcasting packet 608 can include, without limitation, a user activity identifier, a timestamp associated with the user activity representing a time when the user device detected the user activity, and a Received Signal Strength Indicator (RSSI) indicating the strength of a signal associated with the response to the broadcasting packet. The data management system can analyze the responses' content and perform relevant operations described herein, including changing the operating mode of the controller device 604, generating log events, etc.

Figure 7:
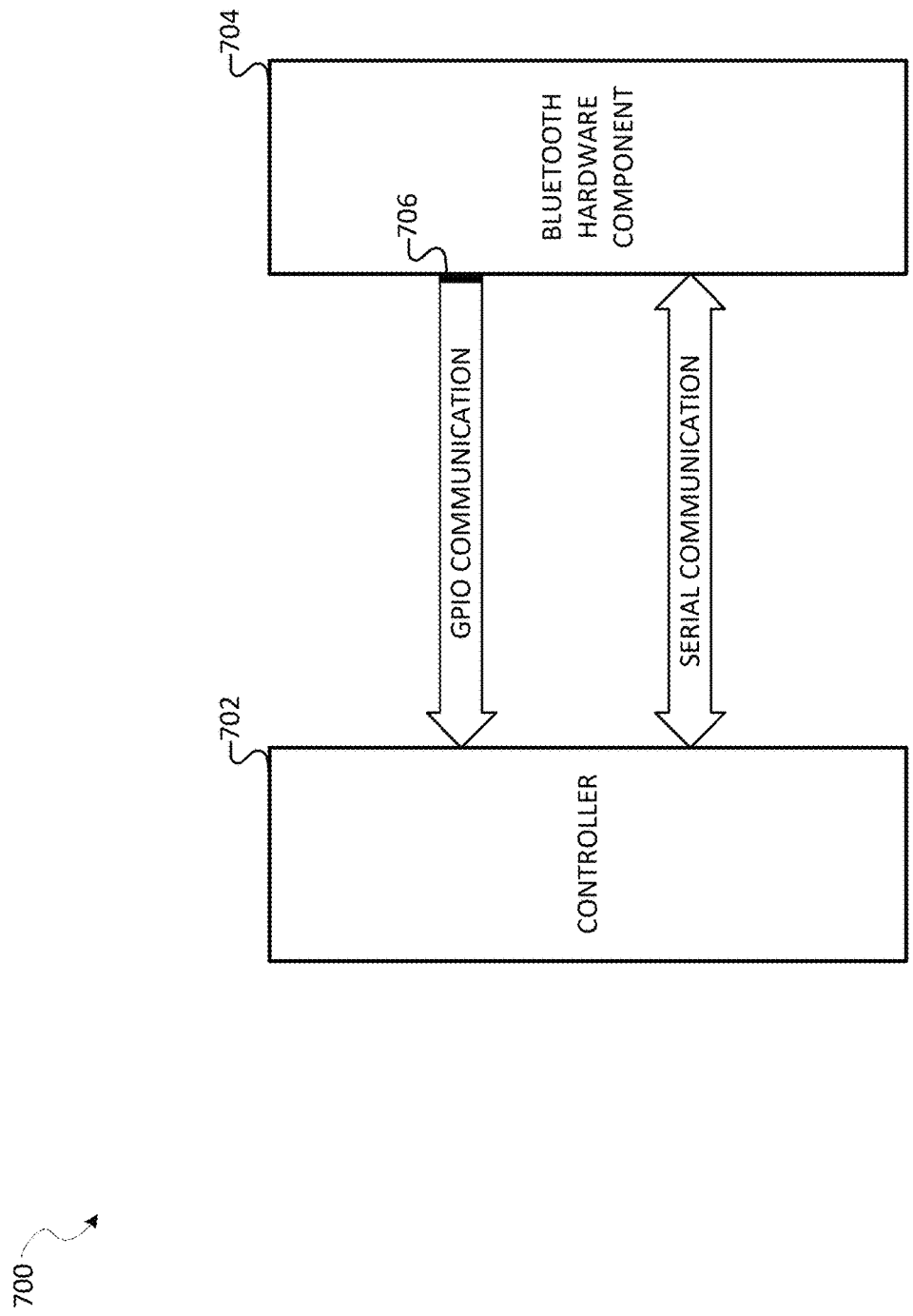
FIG. 7 is a block diagram illustrating data flow within an example data management system that facilitates operating mode control management during operation, according to various embodiments of the present disclosure.

FIG. 7 is a block diagram illustrating data flow 700 within an example data management system that facilitates operating mode control management during operation, according to various embodiments of the present disclosure. As shown, controller 702 can be a microprocessor incorporated into a controller device (e.g., controller device 604). Controller 702 can communicate with Bluetooth hardware component 704 via GPIO and serial communication. For GPIO communication, the data management system can transmit one or more programming commands (e.g., GPIO signals) to monitor and control the operating mode of controller 702, as described herein.

GPIO pin 706 can be configured as a digital input and output (I/O) port. Thereby, production costs can be reduced since a single GPIO pin of a Bluetooth hardware component can handle two-way GPIO communication with the controller 702.

Figure 8:
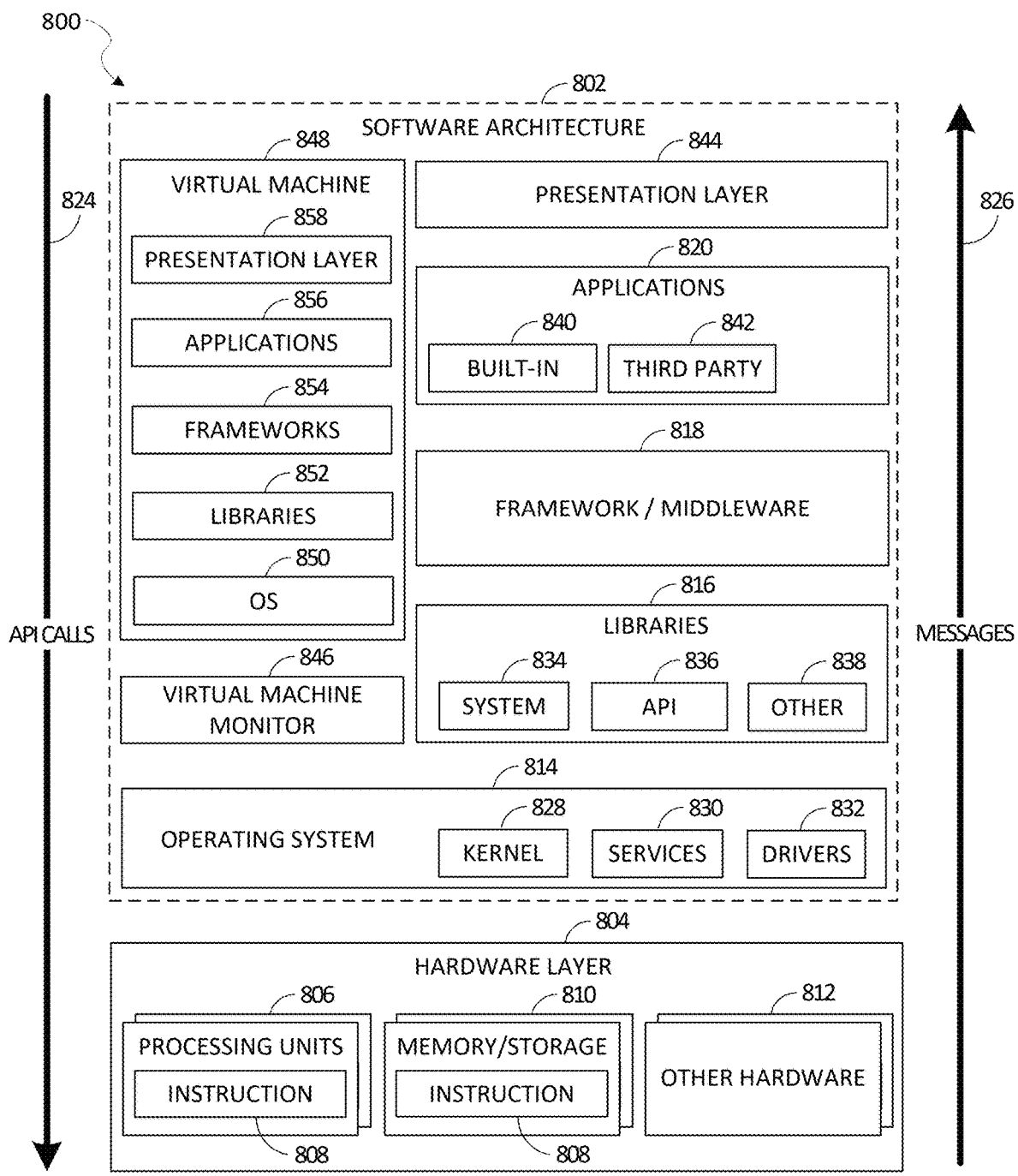
FIG. 8 is a block diagram illustrating a representative software architecture, which may be used in conjunction with various hardware architectures herein described, according to various embodiments of the present disclosure.

FIG. 8 is a block diagram illustrating an example of a software architecture 802 that may be installed on a machine, according to some example embodiments. FIG. 8 is merely a non-limiting example of a software architecture, and it will be appreciated that many other architectures may be implemented to facilitate the functionality described herein. The software architecture 802 may be executing on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 comprises one or more processing units 806 having associated executable instructions 808. The executable instructions 808 represent the executable instructions of the software architecture 802. The hardware layer 804 also includes memory or storage modules 810, which also have the executable instructions 808. The hardware layer 804 may also comprise other hardware 812, which represents any other hardware of the hardware layer 804, such as the other hardware illustrated as part of the machine 900.

In the example architecture of FIG. 8, the software architecture 802 may be conceptualized as a stack of layers, where each layer provides particular functionality. For example, the software architecture 802 may include layers such as an operating system 814, libraries 816, frameworks/middleware 818, applications 820, and a presentation layer 844. The applications 820 or other components within the layers may invoke API calls 824 through the software stack and receive a response, returned values, and so forth (illustrated as messages 826) in response to the API calls 824. The layers illustrated are representative in nature, and not all software architectures have all layers.

The operating system 814 may manage hardware resources and provide common services. The operating system 814 may include, for example, a kernel 828, services 830, and drivers 832. The kernel 828 may act as an abstraction layer between the hardware and the other software layers. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, or drivers 832). The libraries 816 may include system libraries 834 (e.g., C standard library) that may provide functions such as memory allocation functions, string manipulation functions, mathematic functions, and the like.

The frameworks 818 (also sometimes referred to as middleware) may provide a higher-level common infrastructure that may be utilized by the applications 820 or other software components/modules. For example, the frameworks 818 may provide various graphical user interface functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a user software application 104, a home application, a contacts application, a browser application, a book reader application, a location application, a media application, a messaging application, or a game application.

The third-party applications 842 may include any of the built-in applications 840, as well as a broad assortment of other applications.

The applications 820 may utilize built-in operating system functions (e.g., kernel 828, services 830, or drivers 832), libraries (e.g., system libraries 834, API libraries 836, and other libraries 838), or frameworks/middleware 818 to create user interfaces to interact with users of the system.

Figure 9:
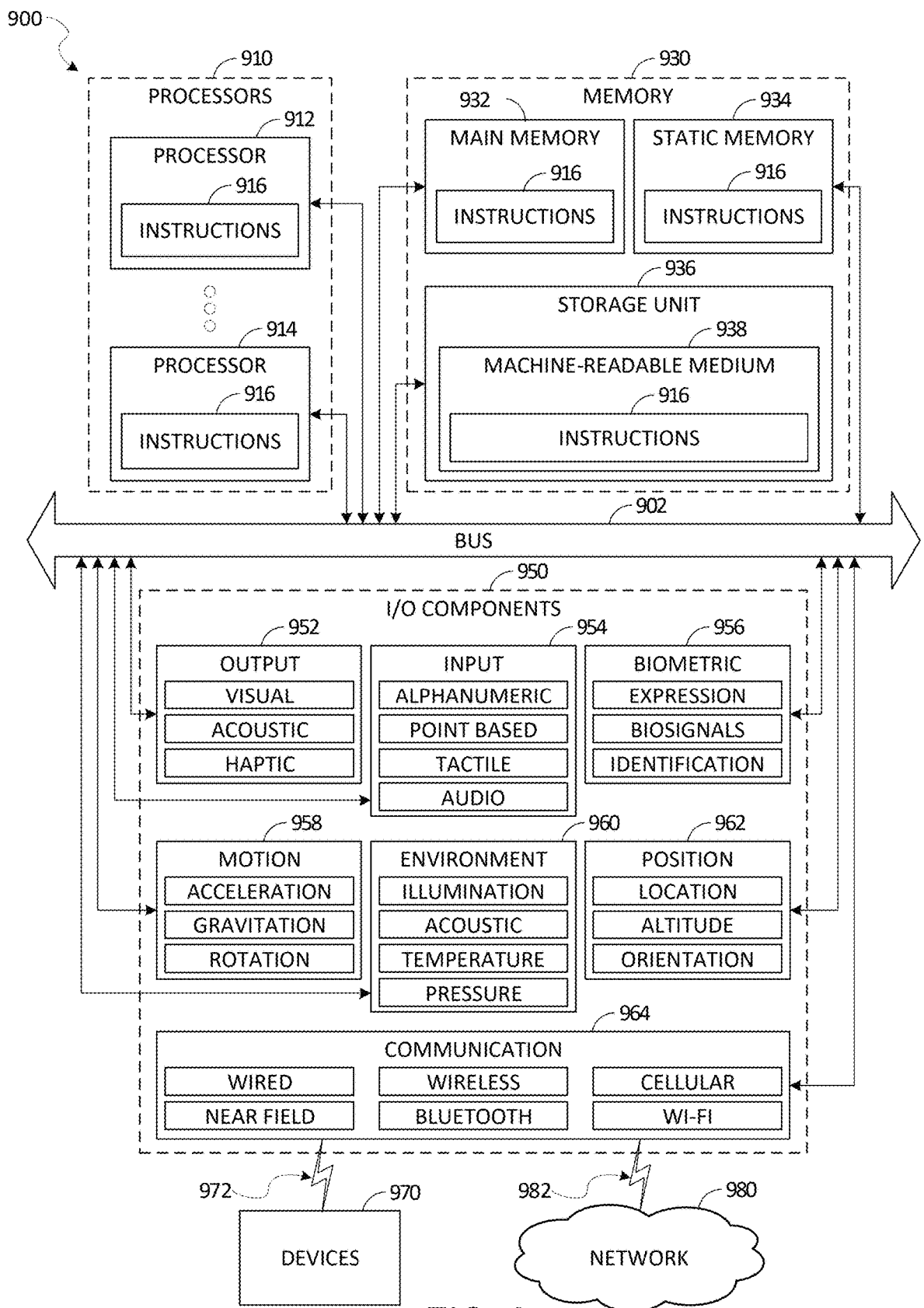
FIG. 9 is a block diagram illustrating components of a machine able to read instructions from a machine storage medium and perform any one or more of the methodologies discussed herein according to various embodiments of the present disclosure.

The virtual machine 848 creates a software environment where applications/modules can execute as if they were executing on a hardware machine (e.g., the machine 900 of FIG. 9). The virtual machine 848 is hosted by a host operating system (e.g., the operating system 814) and typically, although not always, has a virtual machine monitor 846, which manages the operation of the virtual machine 848 as well as the interface with the host operating system (e.g., the operating system 814).

FIG. 9 illustrates a diagrammatic representation of a machine 900 in the form of a computer system within which a set of instructions may be executed for causing the machine 900 to perform any one or more of the methodologies discussed herein, according to an embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 300 described above with respect to FIG. 3, the method 400 described above with respect to FIG. 4, and the method 500 described above with respect to FIG. 5. The instructions 916 transform the general, non-programmed machine 900 into a particular machine 900 programmed to carry out the described and illustrated functions in the manner described. In alternative embodiments, the machine 900 operates as a standalone device (e.g., user device 602, controller device 604) or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a client device (e.g., client device 602), a controller device (e.g., controller device 604), a personal computer (PC), a tablet computer, a laptop computer, a netbook, a personal digital assistant (PDA), an entertainment media system, a cellular telephone, a smart phone, a mobile device, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an embodiment, the processors 910 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936 including machine-readable medium 938, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting.

In further embodiments, the I/O components 950 may include biometric components 956, motion components 958, environmental components 960, or position components 962, among a wide array of other components.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Certain embodiments are described herein as including logic or a number of components, modules, elements, or mechanisms. Such modules can constitute either software modules (e.g., code embodied on a machine-readable medium or in a transmission signal) or hardware modules. A "hardware module," or a "hardware component" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In various embodiments, a hardware module (or a hardware component) is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules.

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 900 including processors 910), with these operations being accessible via a network (e.g., the Internet) and via one or more appropriate interfaces (e.g., an API).

The performance of certain of the operations may be distributed among the processors, not only residing within a single machine 900, but deployed across a number of machines 900. In some example embodiments, the processors 910 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 930, 932, 934, and/or the memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 916 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 980 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
   monitoring an operating mode of a controller via a Bluetooth hardware component;
   causing the Bluetooth hardware component to transmit broadcasting packets at a time interval;
   receiving a response to a broadcasting packet from a user device coupled to the Bluetooth hardware component;
   determining a user activity based on the response; and
   changing the operating mode of the controller based on the user activity.

2. The method of claim 1, wherein the monitoring the operating mode of the controller comprises:
   using the Bluetooth hardware component to detect a General Purpose Input/Output (GPIO) signal from the controller; and
   determining the operating mode of the controller based on the GPIO signal.

3. The method of claim 1, further comprising:
   configuring a pin of the Bluetooth hardware component as a digital input and output (I/O) port; and
   transmitting, via the digital I/O port, one or more programming commands between the controller and the Bluetooth hardware component to change the operating mode of the controller, the one or more programming commands including data representing the user activity.

4. The method of claim 3, further comprising:
   configuring a control logic based on a binary-to-ASCII encoding and decoding mechanism, the control logic allowing the one or more programming commands transmitted between the controller and the Bluetooth hardware component to adjust the operating mode of the controller.

5. The method of claim 4, wherein the binary-to-ASCII encoding and decoding mechanism is used to represent binary data by one or more human-readable ASCII characters.

6. The method of claim 1, wherein the response to the broadcasting packet comprises a user activity identifier and a timestamp associated with the user activity, the timestamp representing a time when the user activity was detected by the user device.

7. The method of claim 6, wherein the broadcasting packet further comprises a Received Signal Strength Indicator (RSSI) indicating a strength of a signal associated with the response to the broadcasting packet.

8. The method of claim 1, wherein the operating mode of the controller is in active mode, and wherein the method further comprises:
   determining a threshold time period elapsed since the response to the broadcasting packet was received;
   changing the operating mode of the controller to standby mode; and
   generating a log event that indicates the controller was changed to the standby mode due to an elapsed threshold time period.

9. The method of claim 1, wherein the operating mode of the controller is in active mode, wherein the response to the broadcasting packet is a first response to a first broadcasting packet, and wherein the method further comprises:
   receiving a second response to a second broadcasting packet within a threshold time period since receiving the first response to the first broadcasting packet;
   determining that a difference between a first RSSI value in the first response and a second RSSI value in the second response is less than a first threshold value;
   determining that the second RSSI value is less than a second threshold value;
   determining that a user activity identifier in the second response does not correspond to a predetermined user activity; and
   based on the determining of the difference, the determining of the second RSSI value, and the determining of the user activity identifier, changing the operating mode of the controller to standby mode.

10. The method of claim 9, further comprising:
    generating a log event that indicates the controller was changed to the standby mode based on the determining of the difference between the first RSSI value and the second RSSI value being less than the first threshold value, the determining of the second RSSI value being less than the second threshold value, and the determining of the user activity identifier not corresponding to the predetermined user activity.

11. A system comprising:
    one or more hardware processors; and
    a non-transitory machine-readable medium for storing instructions that, when executed by the one or more hardware processors, cause the one or more hardware processors to perform operations comprising:
    monitoring an operating mode of a controller via a Bluetooth hardware component;
    causing the Bluetooth hardware component to transmit broadcasting packets at a time interval;
    receiving a response to a broadcasting packet from a user device coupled to the Bluetooth hardware component;
    determining a user activity based on the response; and
    changing the operating mode of the controller based on the user activity.

12. The system of claim 11, wherein the monitoring the operating mode of the controller comprises:
    using the Bluetooth hardware component to detect a General Purpose Input/Output (GPIO) signal from the controller; and
    determining the operating mode of the controller based on the GPIO signal.

13. The system of claim 11, wherein the operations further comprise:

configuring a pin of the Bluetooth hardware component as a digital input and output (I/O) port; and transmitting, via the digital I/O port, one or more programming commands between the controller and the Bluetooth hardware component to change the operating mode of the controller, the one or more programming commands including data representing the user activity.

14. The system of claim 13, wherein the operations further comprise:

configuring a control logic based on a binary-to-ASCII encoding and decoding mechanism, the control logic allowing the one or more programming commands transmitted between the controller and the Bluetooth hardware component to adjust the operating mode of the controller.

15. The system of claim 11, wherein the response to the broadcasting packet comprises a user activity identifier and a timestamp associated with the user activity, the timestamp representing a time when the user activity was detected by the user device.

16. The system of claim 15, wherein the broadcasting packet further comprises a Received Signal Strength Indicator (RSSI) indicating a strength of a signal associated with the response to the broadcasting packet.

17. The system of claim 11, wherein the operating mode of the controller is in active mode, and wherein the operations further comprise:

determining a threshold time period elapsed since the response to the broadcasting packet was received;

changing the operating mode of the controller to standby mode; and generating a log event that indicates the controller was changed to the standby mode due to an elapsed threshold time period.

18. The system of claim 11, wherein the operating mode of the controller is in active mode, wherein the response to the broadcasting packet is a first response to a first broadcasting packet, and wherein the operations further comprise:

receiving a second response to a second broadcasting packet within a threshold time period since receiving the first response to the first broadcasting packet;

determining that a difference between a first RSSI value in the first response and a second RSSI value in the second response is less than a first threshold value;

determining that the second RSSI value is less than a second threshold value;

determining that a user activity identifier in the second response does not correspond to a predetermined user activity; and based on the determining of the difference, the determining of the second RSSI value, and the determining of the user activity identifier, changing the operating mode of the controller to standby mode.

19. The system of claim 18, wherein the operations further comprise:

generating a log event that indicates the controller was changed to the standby mode based on the determining of the difference between the first RSSI value and the second RSSI value being less than the first threshold value, the determining of the second RSSI value being less than the second threshold value, and the determining of the user activity identifier not corresponding to the predetermined user activity.

20. A non-transitory machine-readable medium for storing instructions that, when executed by one or more hardware processors, cause the one or more hardware processors to perform operations comprising:

monitoring an operating mode of a controller via a Bluetooth hardware component;

causing the Bluetooth hardware component to transmit broadcasting packets at a time interval;

receiving a response to a broadcasting packet from a user device coupled to the Bluetooth hardware component;

determining a user activity based on the response; and changing the operating mode of the controller based on the user activity.

\* \* \* \* \*